United States Patent
Lovell et al.

(10) Patent No.: US 7,880,640 B2
(45) Date of Patent: *Feb. 1, 2011

(54) WELLBORE COMMUNICATION SYSTEM

(75) Inventors: John Lovell, Houston, TX (US);
Qingyan He, Pearland, TX (US); Frank Shray, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1126 days.

This patent is subject to a terminal disclaimer.

(21) Appl. No.: 11/440,203

(22) Filed: May 24, 2006

(65) Prior Publication Data
US 2006/0220650 A1 Oct. 5, 2006

Related U.S. Application Data

(62) Division of application No. 10/707,970, filed on Jan. 29, 2004, now Pat. No. 7,080,699.

(51) Int. Cl.
*G01V 1/00* (2006.01)
(52) U.S. Cl. .............. 340/854.6; 340/854.3; 340/854.2; 175/40
(58) Field of Classification Search .............. 340/854.2, 340/854.3, 854.6, 855.1; 175/40
See application file for complete search history.

(56) References Cited

U.S. PATENT DOCUMENTS

| | | | |
|---|---|---|---|
| 3,090,031 | A | 5/1963 | Lord |
| 3,274,798 | A | 9/1966 | Wiggins, Jr. |
| 3,323,327 | A | 6/1967 | Leathers et al. |
| 3,926,265 | A | 12/1975 | Bouyoucos |
| 4,066,995 | A | 1/1978 | Matthews |
| 4,348,672 | A | 9/1982 | Givler |
| 4,387,372 | A | 6/1983 | Smith et al. |
| 4,468,665 | A | 8/1984 | Thawley et al. |
| 4,496,174 | A | 1/1985 | McDonald et al. |
| 4,525,715 | A | 6/1985 | Smith |
| 4,553,097 | A | 11/1985 | Clark |
| 4,578,675 | A | 3/1986 | MacLeod |
| 4,605,268 | A | 8/1986 | Meador |

(Continued)

FOREIGN PATENT DOCUMENTS

EP      0940557      11/2000

(Continued)

*Primary Examiner*—Brian A Zimmerman
*Assistant Examiner*—Hung Q Dang
(74) *Attorney, Agent, or Firm*—Dave R. Hofman

(57) ABSTRACT

A gap collar for an electromagnetic communication unit of a downhole tool positioned in a wellbore is provided. The downhole tool communicates with a surface unit via an electromagnetic field generated by the electromagnetic communication unit. The gap collar includes a first collar having a first end connector and a second collar having a second end connector matingly connectable to the first end connector. The gap collar further includes a non-conductive insulation coating disposed on the first and/or second end connectors, and a non-conductive insulation molding positioned about an inner and/or outer surface of the collars. The insulation molding moldingly conforms to the shape collars. The connectors are provided with mated threads modified to receive the insulation coating. Measurements taken by the downhole tool may be stored in memory, and transmitted to the surface unit via the electromagnetic field.

15 Claims, 6 Drawing Sheets

U.S. PATENT DOCUMENTS

| | | | |
|---|---|---|---|
| 4,691,203 A | 9/1987 | Rubin et al. |
| 4,722,393 A | 2/1988 | Rumbaugh |
| 4,766,442 A | 8/1988 | Issenmann |
| 4,790,380 A | 12/1988 | Ireland et al. |
| 4,823,125 A | 4/1989 | Rorden et al. |
| 4,839,644 A | 6/1989 | Safinya et al. |
| 4,864,293 A | 9/1989 | Chau |
| 4,933,640 A | 6/1990 | Kuckes |
| 4,936,139 A | 6/1990 | Zimmerman et al. |
| 5,089,779 A | 2/1992 | Rorden |
| 5,130,706 A | 7/1992 | Van Steenwyk |
| 5,138,313 A | 8/1992 | Barrington |
| 5,160,925 A | 11/1992 | Dailey et al. |
| 5,163,714 A | 11/1992 | Issenmann |
| 5,174,765 A | 12/1992 | Williams et al. |
| 5,236,048 A | 8/1993 | Skinner et al. |
| 5,260,662 A | 11/1993 | Rorden |
| 5,268,683 A | 12/1993 | Stolarczyk |
| 5,394,141 A | 2/1995 | Soulier |
| 5,396,232 A | 3/1995 | Mathieu et al. |
| 5,509,474 A | 4/1996 | Cooke, Jr. |
| 5,517,464 A | 5/1996 | Lerner et al. |
| 5,530,358 A | 6/1996 | Wisler et al. |
| 5,642,051 A | 6/1997 | Babour et al. |
| 5,708,220 A | 1/1998 | Burge |
| 5,781,436 A | 7/1998 | Forgang et al. |
| 5,883,516 A | 3/1999 | Van Steenwyk et al. |
| 5,941,307 A | 8/1999 | Tubel |
| 5,942,990 A | 8/1999 | Smith et al. |
| 5,945,923 A | 8/1999 | Soulier |
| 5,959,547 A | 9/1999 | Tubel et al. |
| 5,959,548 A | 9/1999 | Smith |
| 6,018,301 A | 1/2000 | Smith |
| 6,018,501 A | 1/2000 | Smith et al. |
| 6,041,860 A | 3/2000 | Nazzal et al. |
| 6,050,353 A | 4/2000 | Logan et al. |
| 6,075,461 A | 6/2000 | Smith |
| 6,075,462 A | 6/2000 | Smith |
| 6,098,727 A | 8/2000 | Ringgenberg et al. |
| 6,112,809 A | 9/2000 | Angle |
| 6,144,316 A | 11/2000 | Skinner |
| 6,150,954 A | 11/2000 | Smith |
| 6,158,532 A | 12/2000 | Logan et al. |
| 6,160,492 A | 12/2000 | Herman |
| 6,177,882 B1 | 1/2001 | Ringgenberg et al. |
| 6,188,222 B1 | 2/2001 | Seydoux et al. |
| 6,208,265 B1 | 3/2001 | Smith |
| 6,209,632 B1 | 4/2001 | Holbert et al. |
| 6,218,959 B1 | 4/2001 | Smith |
| 6,356,205 B1 | 3/2002 | Salvo et al. |
| 6,359,569 B2 | 3/2002 | Beck et al. |
| 6,396,276 B1 | 5/2002 | Van Steenwyk et al. |
| 6,404,350 B1 | 6/2002 | Soulier |
| 6,405,795 B2 | 6/2002 | Holbert et al. |
| 6,439,324 B1 | 8/2002 | Ringgenberg et al. |
| 6,445,307 B1 | 9/2002 | Rassi et al. |
| 6,464,011 B2 | 10/2002 | Tubel |
| 6,516,663 B2 | 2/2003 | Wong |
| 6,531,871 B1 | 3/2003 | Hay et al. |
| 6,572,152 B2 | 6/2003 | Dopf et al. |
| 6,577,129 B1 | 6/2003 | Thompson et al. |
| 6,628,206 B1 | 9/2003 | Soulier |
| 6,657,597 B2 | 12/2003 | Rodney et al. |
| 6,672,383 B2 | 1/2004 | Holbert et al. |
| 6,677,756 B2 | 1/2004 | Fanini et al. |
| 6,750,783 B2 | 6/2004 | Rodney |
| 6,781,520 B1 | 8/2004 | Smith et al. |
| 6,781,521 B1 | 8/2004 | Gardner et al. |
| 6,791,331 B2 | 9/2004 | Conti |
| 6,842,006 B2 | 1/2005 | Conti et al. |
| 6,909,667 B2 | 6/2005 | Shah et al. |
| 6,926,098 B2 * | 8/2005 | Peter ............................ 175/40 |
| 2001/0013412 A1 | 8/2001 | Tubel |
| 2001/0042617 A1 | 11/2001 | Beck et al. |
| 2002/0104653 A1 | 8/2002 | Hosie et al. |
| 2002/0126021 A1 | 9/2002 | Vinegar et al. |
| 2002/0140572 A1 | 10/2002 | Gardner et al. |
| 2005/0001734 A1 | 1/2005 | Miller et al. |

FOREIGN PATENT DOCUMENTS

| | | |
|---|---|---|
| EP | 08322345 | 8/2001 |
| GB | 2364724 | 2/2002 |
| WO | WO8401439 | 4/1984 |
| WO | WO8600112 | 1/1986 |
| WO | WO03004826 | 1/2003 |
| WO | WO2004051050 | 6/2004 |
| WO | WO2004061269 | 7/2004 |

\* cited by examiner

WELLBORE COMMUNICATION SYSTEM

Pursuant to 35 U.S.C. § 120, this application is a division of and claims the benefit of the filing date of U.S. patent application Ser. No. 10/707,970, which was filed on Jan. 29, 2004, now U.S. Pat. No. 7,080,699 and is assigned to the assignee of the present application.

BACKGROUND OF THE INVENTION

The present invention relates to the exploration/production of a subterranean formation penetrated by a wellbore. More particularly, the present invention relates to techniques for communicating between equipment at the surface, and a downhole tool positioned in the wellbore.

The exploration and production of hydrocarbons involves placement of a downhole tool into the wellbore to perform various downhole operations. There are many types of downhole tools used in hydrocarbon reservoir exploration/production. Typically, a drilling tool is suspended from an oil rig and advanced into the earth to form the wellbore. The drilling tool may be a measurement-while-drilling (MWD) or a logging-while-drilling (LWD) tool adapted to perform downhole operations, such as taking measurements, during the drilling process. Such measurements are generally taken by instruments mounted within drill collars above the drill bit and may obtain information, such as the position of the drill bit, the nature of the drilling process, oil/gas composition/quality, pressure, temperature and other geophysical and geological conditions.

In some instances, it may be desirable to obtain additional data from the wellbore after drilling is complete. In such cases, the downhole drilling tool may be removed, and a separate downhole evaluation tool, such as a wireline, slickline, drill stem test or coiled tubing tool, may be lowered into the wellbore to perform additional testing, sampling and/or measuring. Downhole evaluation tools may be lowered into the wellbore via a conveyor, such as wired cable, drill pipe, slickline or coiled tubing. The evaluation tool may be withdrawn by its conveyor, or detached and left in the wellbore for later retrieval. Downhole drilling and/or measurement tools may be provided with communication systems adapted to send signals, such as commands, power and information, between a downhole unit housed in the downhole tool, and a surface unit. Communication systems in drilling tools may include, for example, mud pulse systems that manipulate the flow of drilling mud through a downhole drilling tool to create pressure pulses. One such mud pulse system is disclosed in U.S. Pat. No. 5,517,464 and assigned to the assignee of the present invention.

Communication systems in evaluation tools are typically incorporated into the conveyor itself, for example via wireline cable, wired drill pipe or wired coiled tubing. In such cases, wiring is usually provided in the conveyor to transmit signals between the surface and the downhole tool. The conveyor is often a wireline or armored set of insulated electrical cables which provides power to the tool, and controls the operation of the tool. The conveyor is often used to provide a wired communications link for the telemetry of signals between a surface control system (such as a computer) and the downhole tool. The tensile strength of the wireline cable may be a limit to the weight of the downhole tool and/or the physical and mechanical severity of the borehole conditions in which a downhole tool can be deployed.

In some instances, the communication system is unavailable, inactive or detached, such as during memory mode logging. In such situations, data is collected and stored in a memory unit within the downhole tool for later retrieval. By way of example, some wireline tools are deployed into the wellbore without the wireline connection between the surface system and the downhole tool. The use of a wireline can be too risky to use, or too costly to justify the expense. In such a case, the wireline cable is detached and the logging tool operates using self-contained power supplies (usually batteries) and data memory units (data memory and circuitry to bus the data from the sensors). Such a tool is placed in operation at the surface, then lowered into the wellbore by a conveyor, or dropped or pumped down the wellbore. The tool may be moved past multiple depth intervals, or it may be left at a single depth in the well. Regardless, the tool will record well data and store the data in memory for collection by the operator at some future time, such as when the tool is returned to the surface. During this type of 'memory mode' logging, the operator typically has no communication with the tool to ensure that the tool is working properly throughout the operation, to turn the tool off and on, to change the type of data collected by the tool, or to change the frequency at which the data is collected.

The data collected during memory mode logging is typically retrieved by establishing (or re-establishing) a wired or mud pulse communication link between the downhole tool and the surface, or by retrieving the tool to the surface and downloading the information from the memory unit. While such techniques provide ways to capture downhole data stored in a downhole tool, there remains a need for techniques which facilitate the transmission of such data to the surface. It is desirable that such techniques utilize wireless technology to transfer the data. It is further desirable that a system be provided that is capable of providing a wireless telemetry link, while also providing many of the benefits of a wireline cable.

Wireless communication techniques, such electromagnetic (or emag) telemetry systems, have been employed in downhole drilling tools. Such systems include a downhole unit that creates an electromagnetic field capable of sending a signal to a remote surface unit. Examples of electromagnetic telemetry system are disclosed in U.S. Pat. Nos. 5,642,051 and 5,396,232, both of which are assigned to the assignee of the present invention. Current electromagnetic telemetry systems have been used in conventional MWD type drilling operations. It would be desirable to develop an electromagnetic telemetry system for evaluation tools.

Advancements, such as the use of repeaters and gaps, have been implemented in existing drilling tools to improve the operability of electromagnetic systems in drilling applications. By creating a gap, or non-conductive insert, between adjoining sections of drillpipe, the electromagnetic field is magnified and provides an improved signal. Examples of a gap used in an electromagnetic telemetry system are described in U.S. Pat. No. 5,396,232, assigned to the assignee of the present invention and U.S. Pat. No. 2,400,170 assigned to Silverman.

Electromagnetic telemetry systems incorporating gaps have been vulnerable to the leakage of drilling fluids into the circuitry mounted in drilling tools, resulting in failure of the electromagnetic telemetry system. Wellbore fluids tend to leak into the gap and between adjacent drill collars as well as into the electromagnetic circuitry housed in the drill collar. In an attempt to reduce such leakage, attempts have been made to install insulation into and between drill collars. Some examples of patents employing insulation in an electromagnetic system include U.S. Pat. No. 5,138,313 to Barrington, PCT Application No. 03/004826 to Frasier et al. and U.S. Pat. No. 4,348,672 to Givier. U.S. Pat. Nos. 6,098,727 and 6,493, 324 to Ringgenberg et al. describe additional insulation technique involving coating threads of adjacent drill collars to create an insulating joint.

Existing insulation techniques have been vulnerable to damage in the harsh wellbore environments. Additionally, the insulation techniques have created problems in establishing proper mating between drill collars. Often, the insulation prevents the torquing necessary to create a sufficient connection between the drill pipes. To overcome such problems, jam nuts and epoxys have been used between adjacent drill pipes in an attempt to generate the required connection. However, there remains a need to provide improved insulation techniques to prevent failures in such gap systems. It would be desirable that such a system be capable of performing under harsh wellbore conditions, provide signals with reduced attenuation and/or provide stronger signals capable of operating in a variety of conditions.

SUMMARY OF THE INVENTION

In an aspect, the present invention relates to a gap collar for an electromagnetic communication unit of a downhole tool positioned in a wellbore. The downhole tool communicates with a surface unit via an electromagnetic field generated by the electromagnetic communication unit. The gap collar includes a first collar having a first end connector, a second collar having a second end connector matingly connectable to the first end connector, a non-conductive insulation coating and a non-conductive insulation molding. The non-conductive insulation coating is disposed on the first end connector and/or second end connector. The non-conductive insulation molding is positioned about an inner and/or outer surface of the collars and moldingly conforms to the shape thereof.

In another aspect, the invention relates to a downhole electromagnetic telemetry unit for communication with a surface electromagnetic communication unit. The downhole electromagnetic telemetry unit is disposed in a downhole tool positioned in a wellbore. The downhole electromagnetic telemetry unit includes a gap collar, electromagnetic circuitry and a non-conductive insulation molding. The gap collar includes a first conductive collar, a second conductive collar and a non-conductive insulation coating therebetween. The electromagnetic circuitry is operatively connected to each conductive collar whereby an electromagnetic field is generated. The non-conductive insulation molding is positioned about an inner and/or outer surface of the collars and moldingly conforms to the shape thereof.

In another aspect, the invention relates to a method of generating an electromagnetic field from a downhole tool positioned in a wellbore. The downhole tool has electronic circuitry adapted to communicate with a surface unit via the electromagnetic field. The method includes providing the downhole tool with a gap collar to house the electromagnetic circuitry, moldingly conforming a non-conductive insulation molding about an inner and/or outer surface of the collars and applying the electromagnetic field across the gap collar. The gap collar includes a first and a second conductive collar matingly connected together with a non-conductive insulation coating therebetween to form a capacitive element. The insulation molding conforms to the shape of the drill collar(s).

In another aspect, the invention relates to a method of providing downhole information to a surface unit. The wellbore is formed by advancing a drilling tool into the earth. The method includes positioning a downhole tool in a wellbore, measuring downhole data using sensors positioned in the downhole tool, storing the downhole data in a memory unit positioned in the downhole tool and transmitting at least a portion of the downhole data to the surface via the electromagnetic field. The downhole tool has an electromagnetic telemetry system adapted to communicate via an electromagnetic field with the surface unit.

Finally, in yet another aspect, the invention relates to a gap collar for an electromagnetic communication unit of a downhole tool positioned in a wellbore. The downhole tool communicates with a surface unit via an electromagnetic field generated by the electromagnetic communication unit. The gap collar includes a first collar having a first threaded end connector, and a second collar having a second threaded end connector matingly connectable to the first threaded end connector. The gap collar further includes a non-conductive insulation coating and a non-conductive insulation molding. The non-conductive insulation coating is disposed on the first and/or second threaded end connector. The insulation coating is adapted to electrically insulate the first and second threaded end connectors. The non-conductive insulation molding is positioned about an inner and/or outer surface of the collars. The first and/or second threaded end connector is modified from a standard threaded end connector to receive the non-conductive insulation coating whereby the contact area between the threaded connectors is increased.

The downhole tool is capable of being operated in memory mode, such as for the purposes of making and storing geological, geophysical, or petrophysical measurements (porosity, resistivity, gamma ray, formation dip, formation velocity, etc.); subsurface monitoring (subsidence, fluid migration, formation pressure, etc); production testing and monitoring (drill stem testing, fluid flow rate, fluid pressure, etc.) The downhole tool may be dropped, pumped, or conveyed into a well (or any subsurface structure such as a cave, salt dome, storage cavern, etc) by any device or means (such as slickline, wireline, drill pipe, coiled tubing, etc.) The downhole tool may be left in the well with no direct connection to the device that conveyed it, or the tools may be moved continuously or from stationary point to point.

The data communication channels made available by the electromagnetic communication unit enable the operator at the surface to selectively check that the tool is functioning within its desired operating limits. It will also provide some amount of data that a customer could use to make decisions and take actions in before the tools return to the surface. It can provide a two-way communication channel so as to send commands to the tool and receive information back. These commands can be used, for example, to operate any portion of the tool. Such commands can be used to turn the tool, or some portion of the tool (such as a minitron generator, etc) off or on, change the type of data being acquired or transmitted, or change the sampling rate of the data being acquired or transmitted. The memory mode downhole tool may provide a relatively low cost option with additional functionality of service.

A sub-assembly is formed to facilitate communication between uphole equipment and a downhole assembly in a hydrocarbon reservoir drilling system that features insulation layers positioned about an electromagnetic communication unit to prevent electrical and structure compromise. Specifically, the sub-assembly includes a first collar having a threaded end connector and a second collar having a threaded end connector matingly connectable to the threaded end connector of the first collar. An insulation coating, such as a ceramic coating, is disposed on one of the first threaded end connector, the second threaded end connector and combinations thereof. The insulation coating electrically insulates the first and second threaded connectors.

A bearing is disposed between the first and second collars to provide contact between shoulders the first and second drill collars. The bearing is configured to allow the first and second collar to be torqued together without compromising the electrical integrity of the insulation coating. In this manner, the first and second threaded connectors, along with the insulation material, defines a capacitive element that facilitates communication between uphole equipment and downhole assemblies.

A sub-assembly may be used to facilitate communication between uphole equipment and a downhole assembly in a hydrocarbon reservoir drilling system. The method involves providing first and second collars, varying geometries of the first threaded end connector, defining varied geometries, disposing an insulation coating on the varied geometries defining a coated end connector with a sufficient quantity of the insulation coating being present to provide the coated end connector with a shape substantially complementary to the second threaded end connector and coupling together the first and second end connectors defining a coupled section. Each of the collars has a threaded end connector disposed thereon defining first and second threaded end connectors, respectively.

Other aspects and advantages of the invention will be apparent from the following description and the appended claims.

DETAILED DESCRIPTION OF THE INVENTION

Figure 1A:
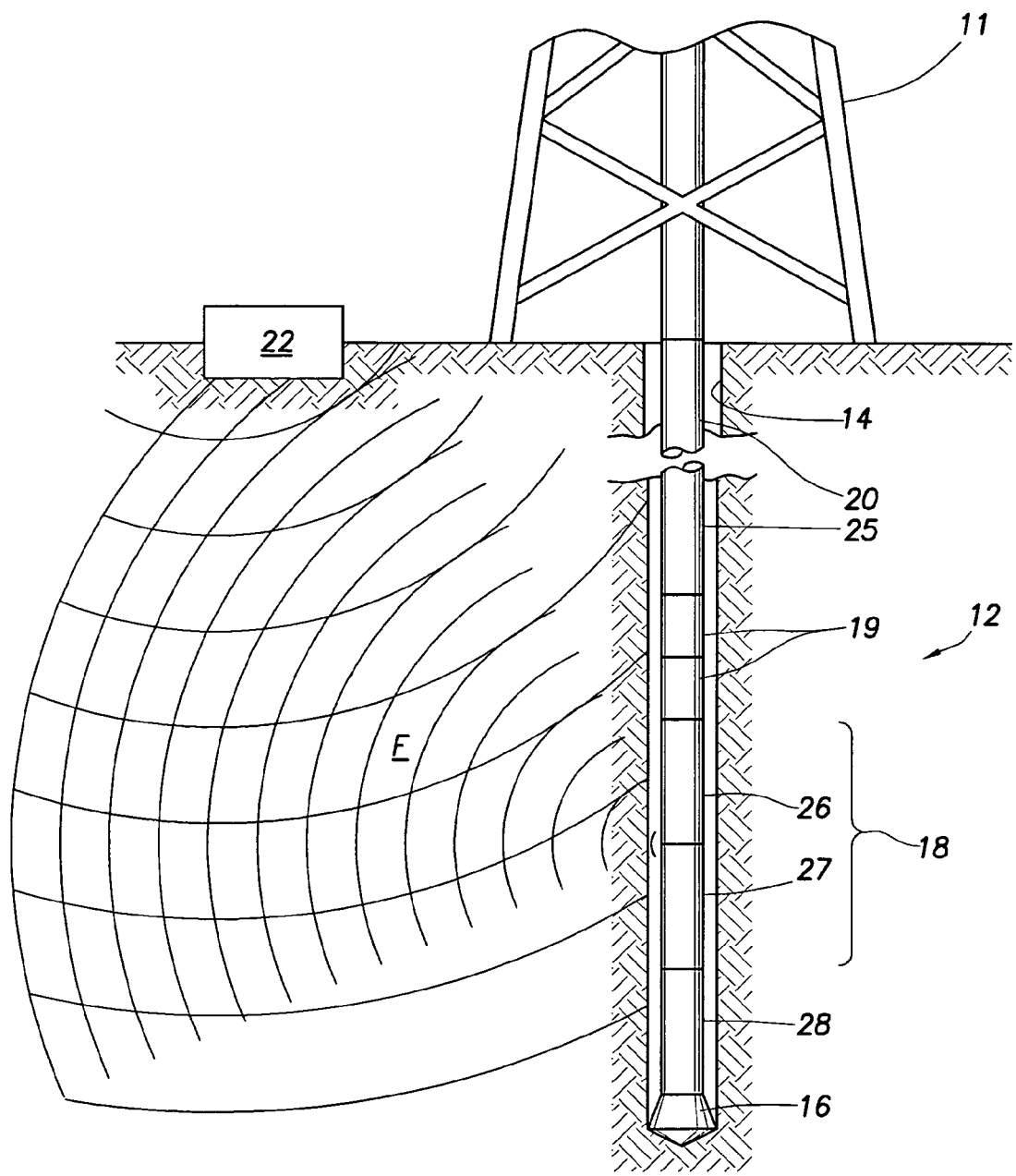
FIG. 1A is a schematic illustration of an electromagnetic communication system for a downhole drilling tool suspended from a rig and positioned in a wellbore.

FIG. 1A depicts a downhole drilling tool 12 provided with a downhole electromagnetic communication unit 18. The downhole tool 12 is suspended from a rig 11 and into a wellbore 14. The downhole tool 12 is adapted to drill the wellbore 14. The downhole tool 12 is operatively connected to the rig 11 via drill string 20 and includes a drill bit 16 at a lower end thereof The drill string includes a plurality of drill collars connected to form the drill string. Two such adjacent drill collars 26 and 27 house the electromagnetic communication unit 18. Various components, such as sensors 19, power unit 28, a memory unit 25, electromagnetic communication unit 18 as well as other components, are positioned in one or more drill collars and enable the downhole tool to perform various downhole operations. The downhole electromagnetic communication unit is operatively coupled, preferably via a wireless communication link, to a surface electromagnetic communication unit 22 for communication therebetween.

The downhole tool may optionally be provided with mud pulse, wired drill pipe or other communication links for transmission between the surface and the downhole tool. In cases where the communication link is inactive or non-existent and the downhole tool is incapable of transmitting data to the surface, the downhole tool stores such data in the memory module 25 in the downhole tool. In such cases of non-communication, the data may be retrieved from the memory module by retrieving the tool to the surface. Alternatively, the downhole electromagnetic communication unit may be used to generate an electromagnetic field F receivable by the surface unit 22. The electromagnetic field wirelessly transmits data collected in the memory module 25 to the surface unit 22. By way of example, the electromagnetic communication unit may be used to communicate data to the surface when the tool is performing memory mode logging. The surface unit 22 is also adapted to generate an electromagnetic field receivable by the electromagnetic unit 18.

Figure 1B:
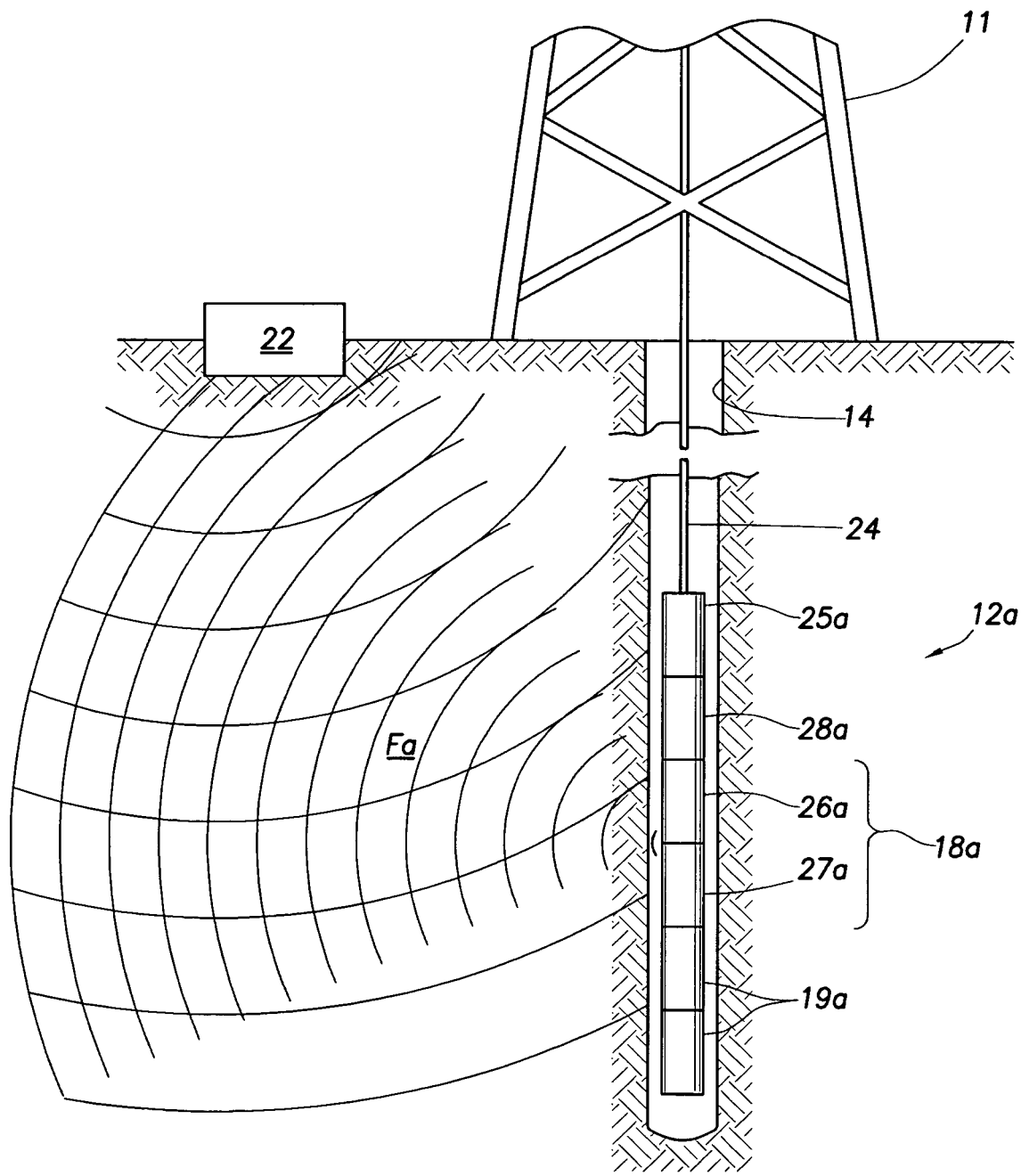
FIG. 1B is a schematic illustration of an electromagnetic communication system for a downhole wireline tool suspended from a rig and positioned in a wellbore.

FIG. 1B depicts a downhole tool 12a disposable in the wellbore 14 for performing various formation evaluation operations, such as testing and sampling. The downhole tool 12a may include various components, such as power, sample chambers, hydraulic units, probes, packers, anchors or other devices, such as those described in U.S. Pat. Nos. 4,936,139 and 4,860,581, assigned to the assignee of the present invention. Such components may include sensors 19a adapted to take various measurements (ie. pressure, temperature, and other downhole parameters), a power module 28a, a memory module 25a and telemetry modules 26a and 27a.

The downhole tool 12a is suspended in the wellbore via a wireline cable 24. The downhole tool may optionally be lowered to selected depths in the wellbore via various conveyors, such as a slickline, drill pipe, coiled tubing or other known techniques. Such a connector may be wired such that signals may pass between the surface and downhole tool to perform various operations and transmit data. The connector may be selectively deactivated, released, or reconnected as will be understood by those of skill in the art.

Data collected by the downhole tool may be retrieved from the memory module upon retrieval of the tool to the surface, or by transmission via the wireline cable for later use. In cases where the connector is detached, deactivated or incapable of transmitting data to the surface, the downhole tool stores such data in a memory module 25a in the downhole tool. The data may be transmitted to the surface via an electromagnetic communication 18a positioned in telemetry modules 26a and 27a. The downhole electromagnetic communication unit 18a may be used to generate an electromagnetic field Fa receivable by the surface unit 22. The electromagnetic field is capable of wirelessly transmitting data collected in the memory module 25a to the surface unit 22.

Figure 2:
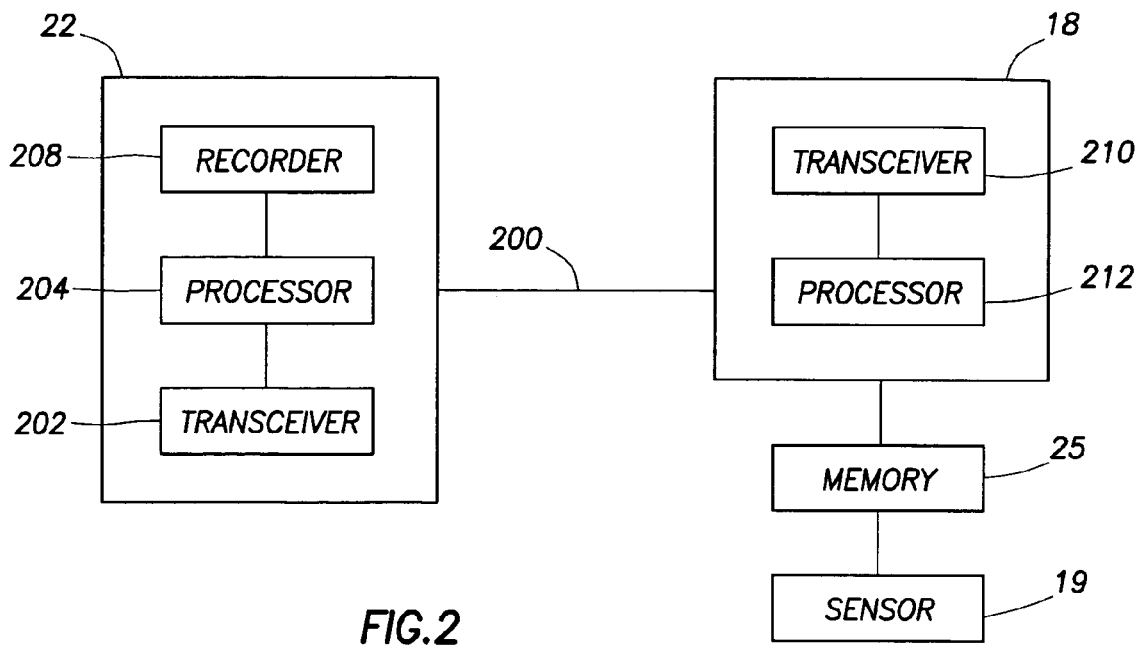
FIG. 2 is a block diagram of the electronics of the electromagnetic communication system of FIG. 1.

FIG. 2 depicts the communication between the surface and downhole electromagnetic communication units of FIG. 1A. A wireless communication link 200 is established between the surface electromagnetic communication unit 22 and the downhole electromagnetic communication unit 18. Data collected via a sensors 19 is stored in memory 25. The sensors and/or memory may be separate from, or integral with, the downhole electromagnetic communication unit. The data is processed via processor 212 and transmitted to the surface via transceiver 210. The transceiver 210 is also adapted to receive signals from and transmits signals to the surface electromagnetic communication unit 22.

The surface unit 22 includes a transceiver 202, a processor 204 and a recorder 208. The transceiver 202 receives signals from and transmits signals to the downhole electromagnetic communication unit 18. The downhole data is received by the uphole transceiver and sent to the programmable processor 204 for processing. The data is then recorded in the recorder 208. A synchronized clock may optionally be coupled to the surface and/or downhole units for synchronization of the electromagnetic system.

Communication link 200 is created by the electromagnetic field F generated by the surface unit 22 and/or the downhole unit 18. The Field F is used as a wireless coupling for the passage of signals between the surface and downhole units.

Figure 4:
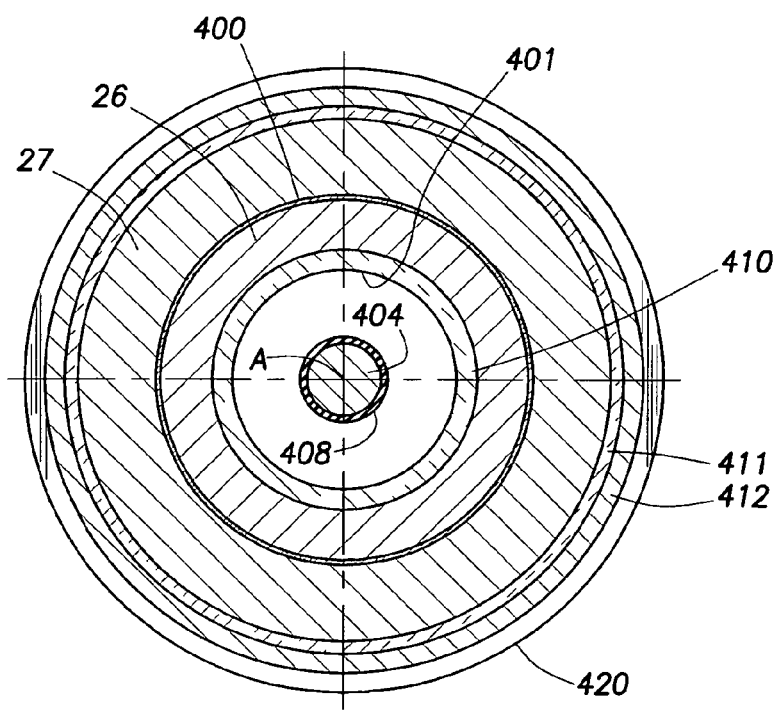
FIG. 4 is cross-section of a portion of a downhole drilling tool shown of FIG. 1 taken along line 4-4.
Figure 3:
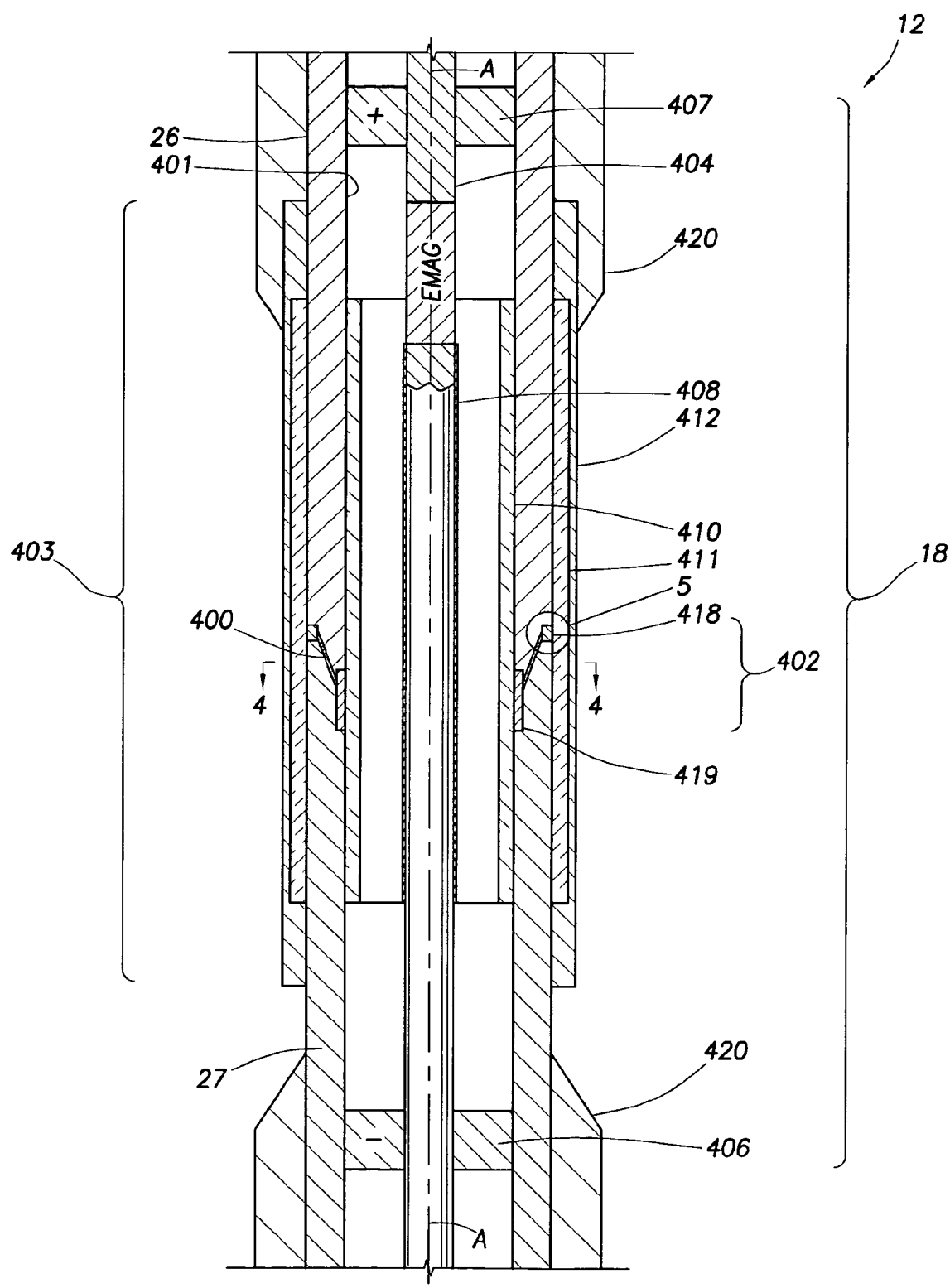
FIG. 3 is a longitudinal cross section of a portion of a downhole drilling tool of FIG. 1.

FIGS. 3 and 4 depict in greater detail a portion of the downhole tool 12 incorporating the downhole electromagnetic communication unit 18 of FIG. 1A. FIG. 3 is a longitudinal cross section of the downhole tool depicting a gap collar 403, upper drill collar 26 and lower collar 27. FIG. 4 is a horizontal cross-sectional view of the downhole tool 12 of FIG. 3 taken along line 4-4.

The upper and lower drill collars 26 and 27 have a passage 401 therein to allow the flow of mud there through. The collars are preferably threadably connected together to form a joint 402. Other connections may also be used, such as heat shrink connectors. An insulation coating 400 is disposed between the drill collars at the joint to provide contact and insulation therebetween. The insulation coating 400 is preferably in powdered form and sprayed onto the threads. The insulation coating is also preferably, for example, a ceramic, such as aluminum oxide.

A metal ring or bearing 418 may be disposed between upper drill collar 26 and lower drill collar 27 to facilitate contact therebetween. As will be described further herein, the insulation coating 400 may interfere with the proper mating of the adjacent drill collars. To assure proper electrical and/or mechanical connection, a metal bearing may be inserted between the drill collars.

An inner sleeve 419 may also be provided along the inner surface of the mated drill collars. Preferably, inner sleeve 419 extends across joint 419 to provide an additional layer of protection. This may be useful during assembly to protect the insulation coating 400 disposed between the drill collars. The inner sleeve is preferably a non-conductive material, such as plastic, that may be similar to the material used for the protective layer 412. The non-conductive material may further assist in enhancing the signal by further magnifying the overall gap between the drill collars.

Mandrel 404 is positioned in the passage 401 and extends through the downhole tool 12. The mandrel is typically positioned symmetrically about an axis A of the downhole tool 12. The mandrel 404 is supported in the downhole tool at a downhole position via lower electromagnetic assembly 406 and an uphole position via upper electromagnetic assembly 407. The upper and lower electromagnetic assemblies are typically of opposite polarity with a gap (not shown) therebetween. The gap is typically embedded within the mandrel between the upper and lower drill collars. The gap collar is used to extend the resistance generated by the electromagnetic communication over a greater distance, and/or to enhance the electrical connection between the mandrel and the drill collars.

A mandrel insulation layer 408 is disposed about mandrel 404. Preferably, the mandrel insulation layer 408 is molded about the mandrel 404 to provide a hydraulic seal thereabout.

An inner molded insulation layer 410 is disposed inside passage 401 along the inner surface of the drill collars. An outer molded insulation layer 411 is disposed about the outer surface of the drill collars. Preferably, the inner and outer molded insulation layers are molded to the surface of the drill collars to provide a hydraulic seal. Because drill collars 26 and 27 are between insulation layers 410 and 411, a seal is created about the drill collars and join 402.

The insulation layers 408, 410 and 411 are preferably made of an elastomeric, or rubber, and non-conductive material adapted to provide a hydraulic seal. The material is moldable so that it may conform to the shape of the adjacent component (ie. the mandrell or the drill collars). An example of a usable rubber that may be used is a nitril rubber.

A protective layer 412 is disposed about the outer insulation layer 411. Preferably, the protective layer and/or outer insulation layer extends across drill collars 26 and 27 to provide a protective sealabout joint 402. Protective layer 412 may be a sleeve extending along upper drill collar 26 and lower drill collar 27, and surrounding insulation layer 411. The protective layer is preferably a non-conductive material that provides a hardened surface to protect the underlying insulation layer. Such materials may include, for example, plastics, hardened elastomers, fiberglass and other materials capable of providing additional protection to the insulation layer.

The communication unit 18 may also be provided with additional protectors, such as wear bands 420. Wear bands 420 are positioned about the drill collars 26 and 27 and may or may not overlap layer 412. The wear bands are preferably hardened metal surfaces adapted to receive the major impact of forces applied to downhole electromagnetic communication unit. The wear bands preferably provide a raised contact surface, or standoff, to further protect the outer surface of the downhole communication unit. In other words, the distance from axis A to an outer surface of the wear band is preferably greater than the distance from axis A to the outer surface of the drill collars, outer layer 411 and/or protective layer 412 (if present). This provides an initial point of contact for the drilling tool as it passes through the wellbore.

The layers, coatings and other protectors may be also used to ensure that the mechanical and electrical properties of capacitive element 500 are not compromised by the operating environment. For example, insulation layers 408, 410 and 411 are used to establish a hydraulic seal to minimize resistance loss and/or prevent exposure of moisture or water to the electromagnetic communication unit. Additionally, the insulation may extend the length of capacitive element 500 to improve the signal generated by the downhole communication unit 18.

Figure 5:
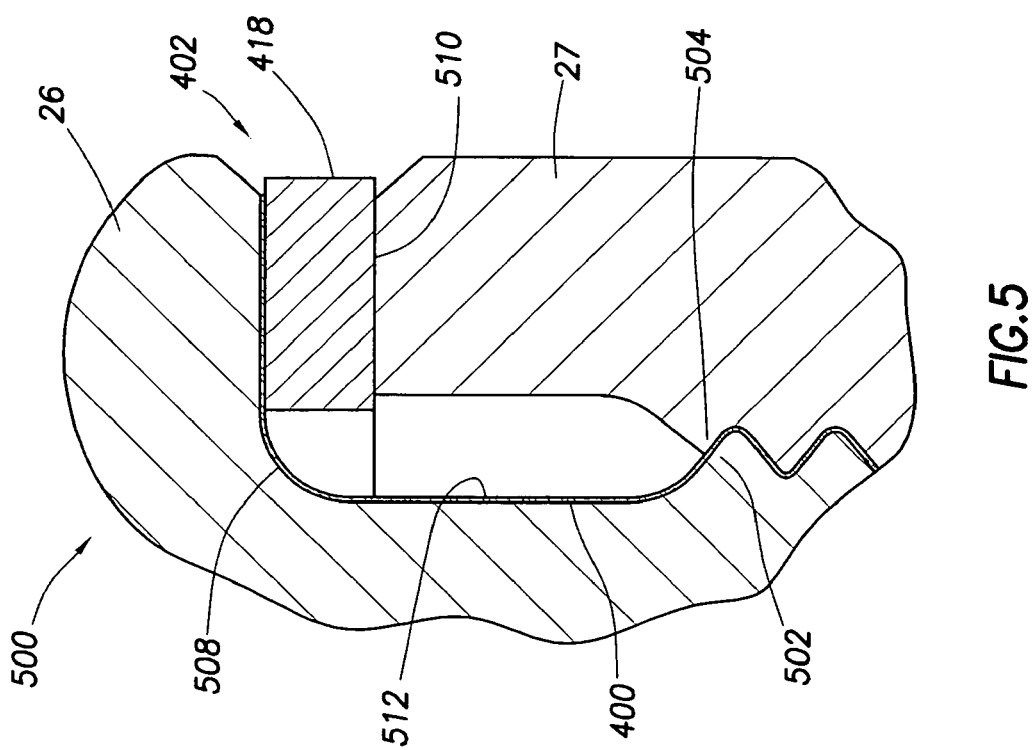
FIG. 5 is a detailed view of a portion of the downhole drilling tool of FIG. 3 within circle 5, depicting the insulated connection of adjacent drill collars.

The nonconductive components, such as the layers, coatings, seals and protectors, also create a non-conductive gap between the conductive drill collars 26 and 27. This non-conductive gap is used to assists in generating and/or magnifying the electromagnetic signal. FIG. 5 is a blowup of the portion of the downhole tool 12 in circle 5 of FIG. 3. FIG. 5 shows a detailed view of the connection between drill collars 26 and 27 at joint 420. The male portion of drill collar 26 is threadably connected via male threads 502 to the female portion of adjacent drill collar 27 and its corresponding, mated female threads 504. Bearing 418 is disposed between shoulder 508 of upper drill collar 26 and shoulder 510 of lower drill collar 27.

Upper drill collar 26 and lower drill collar 27 are threaded together, with insulation coating 400 disposed therebetween. Insulation coating 400 is disposed upon male threads 502, as well as the shoulder surface 508 extending from the male threads to the outer surface of upper drill collar 26. As shown in FIG. 5, the insulation coating is disposed along the male threads and shoulder of drill collar 26. However, the insulation coating may be applied to the thread and/or shoulder portions of drill collar 26 and/or drill collar 27.

The male and female threads are preferably standard American Petroleum Institute (API) threads. However, the insulation may have a thickness that contributes to interference with the proper mating of the threads and the proper contact between the shoulders of the adjacent drill collars. To provide the desired connection, the threads (male only, female only or both) may need to be adjusted for the application and intervening presence of the insulation material between mated threads.

Figure 6A:
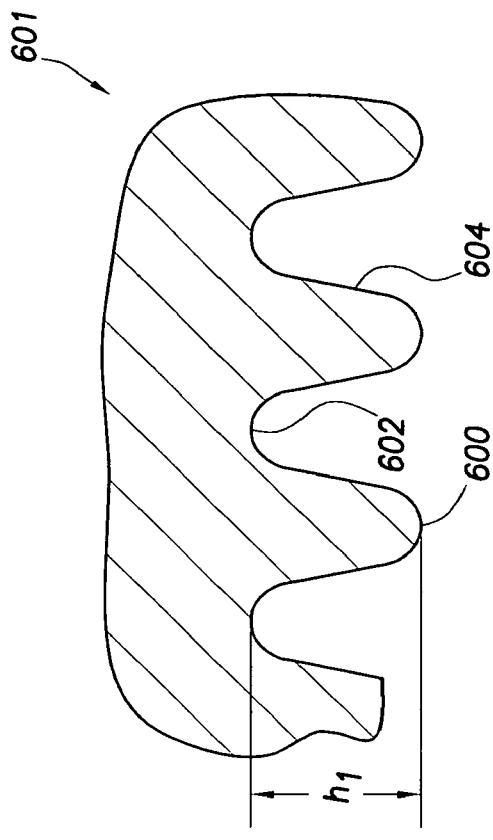
FIG. 6A is a detail of a standard thread of a drill collar.

FIGS. 6A-6D depict an example of the dimensions of a standard thread and its adjustment for the application of insulation material thereon. FIG. 6A depicts a standard API thread 601, such as the male thread 502 of FIG. 5, before the application of insulation and/or modification. The male thread has peaks 600 and valleys 602 with slopes 604 therebetween. The distance between the peaks 600 and valleys 602 is referred to as the initial height $h_1$.

Figure 6B:
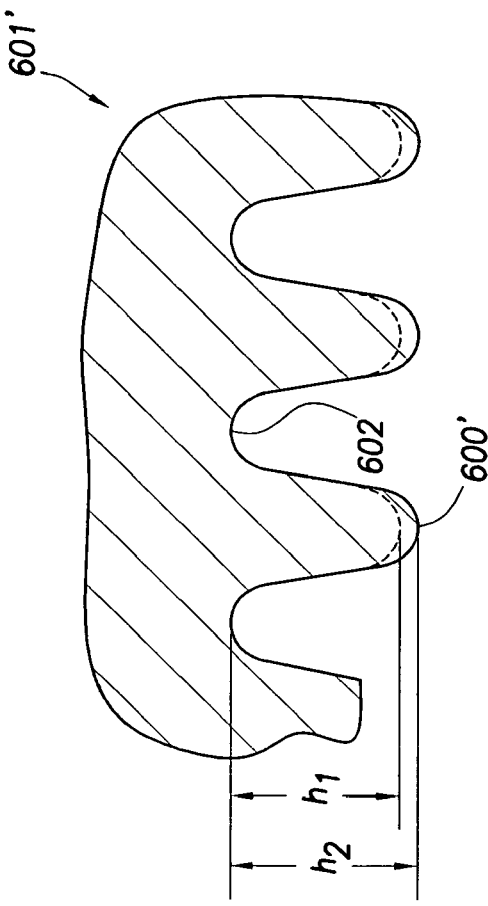
FIG. 6B is a detail of the standard thread of FIG. 6A with a raised peak.

FIG. 6B depicts a modified thread 601'. The shape of thread 601' is modified from the initial shape of thread 601 for the application of an insulation coating. In this case, the peaks 600 of the threads are increased to an extended peak 600'. The resulting height between the higher peaks 600' and valleys 602 is a new, increased height $h_2$.

Figure 6C:
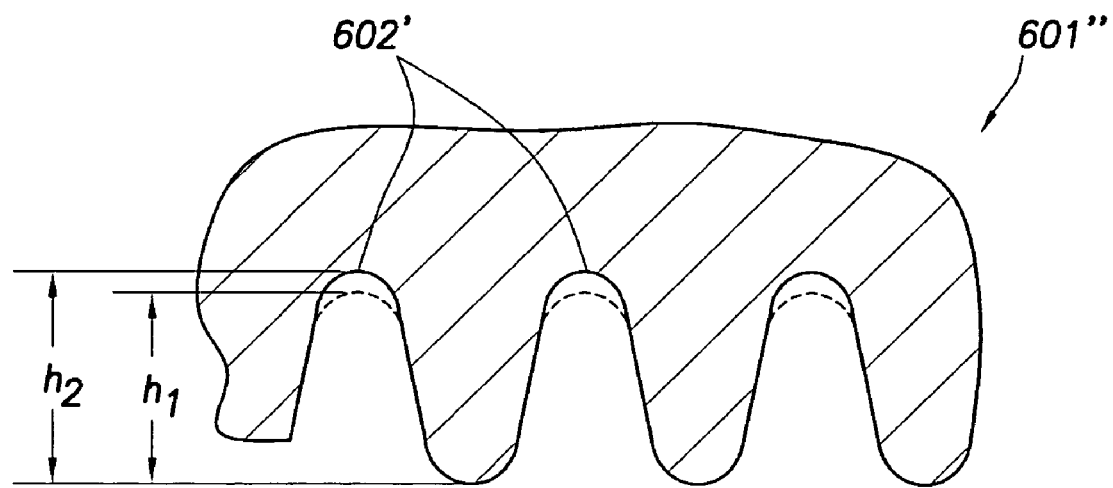
FIG. 6C is a detail of the standard thread of FIG. 6A with a deepened valley.

FIG. 6C depicts an alternate modified thread 601". The shape of thread 601' is modified from the initial shape of thread 601 for the application of an insulation coating. In this case, the valleys 602 of the threads are deepened to a to a deeper valley 602'. The resulting height between the deeper valleys 602' and valleys 602 is new, increased height $h_2$. The valleys 602 may be deepened and/or the slopes 604 may be adjusted. A variety of geometries are envisioned for the male and/or female threads forming the threaded joint.

Figure 6D:
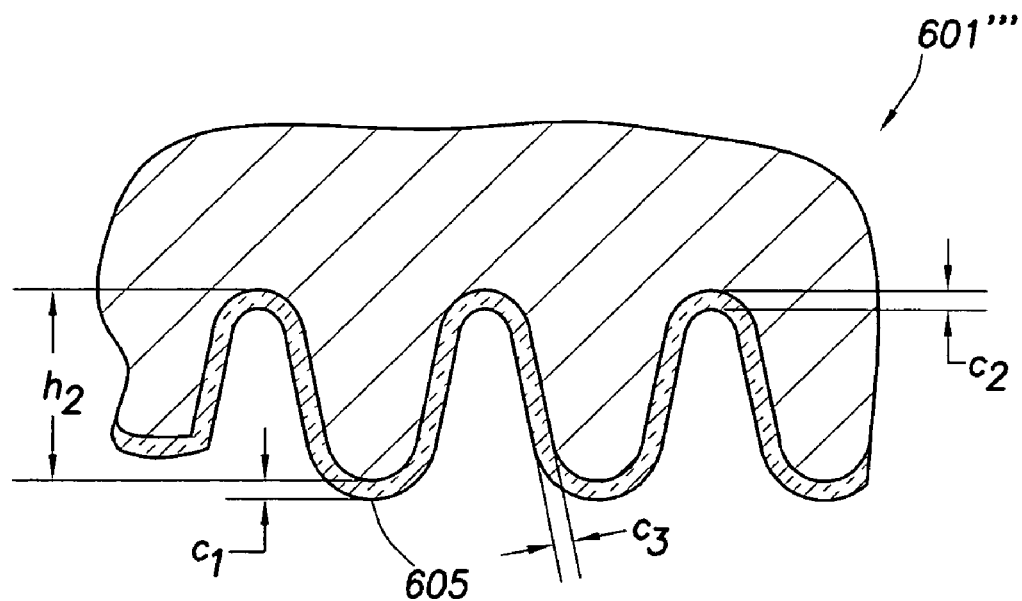
FIG. 6D is a detail of the modified thread of FIG. 6B or 6C with an insulation coating disposed thereon.

As shown in FIG. 6D, modified thread 601' has been coated with insulation coating 605. The insulation coating is preferably applied with sufficient thickness to obtain the desired overall dimension of the combined thread and insulation. In this case, the overall combined dimension of the modified thread and insulation coating 605 is now adapted to mate with a corresponding API thread. The modified thread 601''' could also be generated using modified thread 601" of FIG. 6B.

The thread may be fabricated so that after application of insulation coating 400, the threads with the attached insulation coating define a geometry that is complimentary to mated threads. For example, where threads 601''' define a male API thread, such as male threads 502 of FIG. 5, they are compatible with female API threads, such as the female threads 504 of FIG. 5. To that end, the threads are typically formed by varying dimensions of a standard (API) thread. The dimensions of the thread and insulation coating combination are preferably adapted to mate with the standard API thread dimensions.

As shown in FIG. 6D, the insulation coating 400, may be provided with a thickness $c_1$ on protrusions, a thickness $c_2$ on recesses and/or a thickness $c_3$ on portions therebetween. Thickness $c_1$ may be substantially the same as thickness $c_2$ and/or $c_3$. In a further embodiment, thickness $c_1$ may differ from thickness $c_2$ and/or $c_3$.

The threads are preferably modified to prevent the insulation coating from reducing the contact area between the male and female threads. The threads may be modified such that the stress concentration, or force per unit area, on the insulation coating is reduced below the forces involved with coated standard (non-modified) threads.

Referring back to FIG. 5, the upper and lower drill collars with the insulation coating therebetween define a capacitive element 500. The capacitive element assists in creating the electromagnetic field used for communication between the surface and the downhole communication units. The upper drill collar 26 and lower collar 27 are said to be electrically and mechanically coupled together.

The male threads 502 have been modified and insulation coating 400 applied thereto. Preferably, threads 502 are modified prior to the receipt of insulation coating 400 such that the resulting contact area between male thread 502 and female thread 504 is increased. The increased contact area of the male and female threads assists in reducing stress concentrations within capacitive element 500. The increased contact area is also used to increase the structural integrity of capacitive element 500 by reducing the probability of structural compromise of insulation coating 400 during coupling of male thread and female thread.

The coupling, often referred to as torquing, of the drill collars can damage the insulation coating 400 if too great, but prevent sufficient electrical contact if too little. Additionally, there is preferably sufficient torque applied to insure the mechanical integrity of the joint and prevent mechanical or electrical failure of the system. The torque is preferably comparable to the torque applied to other drill collars in a drill string. It is desirable that the threads and insulation permit the drill collars to be connected such that the torque applied to the drill collars is about at least as great as the other drill collar connections in the remainder of the drill string, typically an average of the torque applied to the remainder of the drill collars. To provide the necessary contact without damage, the contact area is adjusted to distribute the load across the threads and reduce the likelihood of damage to insulation coating 400. Damage to insulation coating 400 may affect the mechanical and electrical integrity of capacitive element 500, which may result in an electrical short between male and female threads. This may, in turn, lead to a drastic reduction in the amplitude of the transmitted signal.

Preferably, the stress concentration applied to capacitive element 500 is limited to a level that is below a maximum stress concentration level. The maximum stress concentration level is defined as that stress concentration level that will cause a compromise of a structural integrity of capacitive element 500. By having a stress concentration within capacitive element 500 that is less than a maximum stress concentration, application of substantially the same amount of torque that is applied to downhole assembly 12, shown in FIG. 1A, is applied to capacitive element 500. This provides direct torquing of first collar 26 and second collar 27.

Upon coupling together the upper and lower drill collars, male threads 502 and female threads 504 are mated together. Male threads 502 and female threads 504 define the plates of capacitive element 500, and insulation coating 400 defines the dielectric. Capacitive element 500 may be employed to facilitate communication, for example, by modulating the applied voltage transmission of signals. The frequency of the voltage applied is a function of choice of design and determined in part by the impedance of capacitive element, as defined by, inter alia, of the contact area between male thread 502 and female thread 504, as well as the dielectric constant insulation coating 400 and thickness thereof. At frequencies lower than a few hundred Hertz the impedance of the capacitive element will be dominated by its resistivity, which in turn will be dominated by the amount of moisture remaining in the capacitive element. In a preferred embodiment, heat would be applied to the capacitive element to remove as much moisture as possible and then the dielectric material would be sealed with epoxy to disallow moisture from repenetrating the dielectric.

The dimensions of male thread 502 and insulation coating 400 may result in spaces, voids and/or other cavities between upper drill collar 26 and lower drill collar 27. It may be required to fill some of these voids and cavities to maintain the structural integrity of capacitive element 500 during operation. For example, a cavity 512 may be present between male and female threads 502 and 504. To prevent structural compromise of insulation coating 400 due, for example, to expansion of gases that may be trapped therein, epoxy or some other suitable material may be injected therein. In this fashion, the gases, or other material, that may undergo volumetric changes when subjected to the downhole environment are removed. The solidification of an epoxy within the cavities also increases the structural rigidity of the device when solidified and helps keep any moisture out of any cavities within the dielectric.

In another example, upon coupling together or upper drill collar 26 and lower drill collar 27, shoulders 508 and 510 may not meet. To provide the desired contact between the shoulders, metal ring or bearing 418 may be inserted. The bearing 418 is positioned such that additional contact is made between the adjacent drill collars and the structural integrity of the capacitive element 500 is increased. Bearing 418 is also positioned to prevent flexing of upper drill collar 26 relative to lower drill collar 27, and to prevent added stress concentrations on insulation coating 400 beyond the maximum stress concentration. This bearing also provides an additional seal about the drill collars.

Bearing 418 is configured and dimensioned accordingly to reduce stress concentration resulting from non-contact between the drill collar shoulders. To that end, bearing 418 dimensions are preferably established based upon the thicknesses $c_1$ and $c_2$ of the insulation coating (FIG. 6D). Bearing 418 is then slid on first collar 26 before torquing of first and second collars together. The collars are preferably torqued together with sufficient force that the mechanical integrity of the collar is maintained, that force being less than that which would cause mechanical failure of the insulating coating on the thread.

In operation, sensors 19 in downhole tool 12 are employed to obtain a plurality of downhole measurements regarding formation and wellbore properties surrounding downhole assembly 12. Such measurements may include, for example, geological, geophysical, or petrophysical measurements such as porosity, resistivity, gamma ray, formation dip, and formation velocity; subsurface measurements such as subsidence, fluid migration, and formation pressure; or production testing and monitoring measurements such as drill stem testing, fluid flow rate, and fluid pressure. The measurement data is stored in memory 14. A command from the surface unit 22 is sent downhole. The command is received by the transceiver 210 in the downhole electromagnetic communication unit 18. the downhole electromagnetic communication unit generates a magnetic field by electrical communication between mandrel 404 and second collar 27. This electrical communication allows application of a voltage across capacitive element 500.

Upon completion of obtaining such data measurements by sensors 19, the data measurements are stored in memory 28, wherein memory 28 is coupled to downhole communication unit 18. Thus, memory mode logging is enabled and employed in downhole assembly 12.

The downhole communication unit 18 is in communication with surface unit 22. The measurements stored in memory 38 are sent from downhole electromagnetic communication unit 18 to the surface via electromagnetic field. The electromagnetic field is injected into the formation surrounding downhole assembly 12 wherein the electromagnetic field propagates to surface unit 22.

Surface unit 22, as mentioned above, receives information from downhole electromagnetic unit 18, typically sent in subsets of the information stored in memory 25. Once surface unit 22 receives such information, a view of conditions about downhole tool 12 can be acquired. This view can allow decisions to be determined regarding operation of the wellbore system.

Commands can then be sent downhole to downhole electromagnetic communication unit 18 via surface unit 22. These commands can include, but are not limited to, activating downhole operations, discontinuation of downhole operations, controlling the types of measurements being acquired or transmitted and changing the sampling rate of the measurements being acquired or transmitted.

While FIGS. 3 through 6 refer to drill collars, it will be appreciated that the drill collars may be collars or modules, such as those threadably assembled to form downhole communication unit of FIG. 1B, or other downhole evaluation tools (ie. wireline, slickline, drill stem test or coiled tubing tools). The components in such cases will be substantially the same, except that they may not contain a passage therethrough to permit mud flow through the tool. Additional non-conductive insulation may or may not be provided along inner surfaces of the collars or about internal mandrels if present within the evaluation tool.

While this invention has been described with references to various illustrative embodiments, the description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A method of providing downhole information from a downhole evaluation tool located in a wellbore to a surface unit, the wellbore formed by advancing a drilling tool into the earth, the method comprising:

positioning the downhole evaluation tool in the wellbore, the downhole evaluation tool having an electromagnetic telemetry system adapted to communicate via an electromagnetic field with the surface unit, wherein the electromagnetic telemetry system comprises a pair of collars matingly connected with a non-conductive insulation coating therebetween, the non-conductive insulating coating defining a gap, and wherein the electromagnetic telemetry system further comprises a non-conductive insulation member extending across the gap about one of an inner surface of the collars, an outer surface of the collars and combinations thereof, the insulation member conforming to the shape thereof;

measuring downhole data using sensors positioned in the downhole tool;

storing the downhole data in a memory unit positioned in the downhole tool; and transmitting at least a portion of the downhole data to the surface via the electromagnetic field.

2. The method of claim 1 wherein the downhole tool is one of a wireline tool, a slickline tool, a coiled tubing tool and combinations thereof.

3. The method of claim 1 wherein the collars have connectors with mated threads, the method further comprising modifying the threads of at least one of the collars for receipt of the non-conductive insulation coating.

4. The method of claim 1 further comprising processing the downhole data to determine a course of action.

5. The method of claim 1 further comprising transmitting commands from the surface unit to the downhole unit for execution thereof.

6. The method of claim 5, wherein transmitting commands from the surface unit to the downhole unit comprises transmitting a command to change the power level of the electromagnetic field.

7. The method of claim 5, wherein transmitting commands from the surface unit to the downhole unit comprises transmitting a command to change a type of the downhole data transmitted to the surface.

8. The method of claim 5, wherein transmitting commands from the surface unit to the downhole unit comprises transmitting a command to change a sampling rate of measuring downhole data.

9. The method of claim 5, wherein transmitting commands from the surface unit to the downhole unit comprises transmitting a command to change the baud rate of the data transmission.

10. A method of constructing a downhole tool, comprising:
    providing an upper collar member;
    providing a lower collar member;
    applying a non-conductive insulating coating to one of a connector on the upper collar member, a connector on the lower collar member and combinations thereof;
    connecting the upper collar member to the lower collar member such that the non-conductive insulating coating defines a gap; and
    applying a non-conductive insulating member about one of the inner surface of the upper and lower collar members, the outer surface of the upper and lower collar members, and combinations thereof, wherein the non-conductive insulating member extends across the gap.

11. The method of claim 10, wherein applying a non-conductive insulating member comprises applying a non-conductive insulating molding.

12. The method of claim 10, further comprising disposing a bearing between a shoulder of the upper collar member and a shoulder of the lower collar member.

13. The method of claim 12, wherein disposing a bearing between the shoulder of the upper collar member and the shoulder of the lower collar member comprises disposing a metal ring between the shoulder of the upper collar member and the shoulder of the lower collar member.

14. The method of claim 11, further comprising disposing a non-conductive sleeve along the inner surface of upper and lower collar members, extending across the gap.

15. A gap collar for an electromagnetic communication unit of a downhole tool positioned in a wellbore, comprising:
    a first collar having a first end connector;
    a second collar having a second end connector matingly connected to the first end connector;
    a non-conductive insulating coating electrically insulating the first end connector from the second end connector, the non-conductive insulating defining a gap;
    means for insulating the outer surface of the first and second collar extending across the gap about one of an inner surface of the collars, an outer surface of the collars and combinations thereof, the insulation member conforming to the shape thereof.

* * * * *